(12) United States Patent
Bhat et al.

(10) Patent No.: US 7,698,280 B2
(45) Date of Patent: Apr. 13, 2010

(54) ACTIVE CACHE OFFLINE SHARING OF PROJECT FILES

(75) Inventors: Sudin Bhat, Redmond, WA (US); Rajendra Vishnumurty, Bellevue, WA (US); Liang Xiao, Redmond, WA (US); Raju Iyer, Newcastle, WA (US); Pradeep GanapathyRaj, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1051 days.

(21) Appl. No.: 11/391,103

(22) Filed: Mar. 28, 2006

(65) Prior Publication Data

US 2007/0239789 A1 Oct. 11, 2007

(51) Int. Cl.
*G06F 17/30* (2006.01)
*G06F 15/16* (2006.01)

(52) U.S. Cl. .............................. 707/10; 707/2; 707/100; 709/206; 709/227

(58) Field of Classification Search ........................ None
See application file for complete search history.

(56) References Cited

U.S. PATENT DOCUMENTS

| 6,587,931 B1* | 7/2003 | Bauman et al. ............. 711/145 |
| 2003/0158947 A1* | 8/2003 | Bloch et al. ................. 709/227 |
| 2004/0205716 A1* | 10/2004 | Abdel-Rahman et al. ... 717/120 |
| 2005/0091226 A1* | 4/2005 | Lin et al. ..................... 707/100 |
| 2005/0165735 A1* | 7/2005 | Lin et al. ........................ 707/2 |
| 2006/0095447 A1* | 5/2006 | Dickinson et al. ........... 707/100 |
| 2006/0143047 A1* | 6/2006 | Briegs et al. .................... 705/2 |
| 2006/0282784 A1* | 12/2006 | Taylor et al. ................. 715/751 |

* cited by examiner

*Primary Examiner*—Cam Y Truong
*Assistant Examiner*—Dung K Chau
(74) *Attorney, Agent, or Firm*—Merchant & Gould; Ryan T. Grace (57) ABSTRACT

In a client-server computer system, an active cache is utilized by a client-based project management application program to share server-based project files with an offline client, so that the project files may be updated by modifications made offline. A project file is saved from the active cache for sharing with the offline client. The shared project file is sent to the offline client for editing. After editing, a modified project file is received from the offline client and saved to the active cache. The active cache initiates an update of the server-based project file with the project file which was modified offline.

18 Claims, 6 Drawing Sheets

Fig. 6

ACTIVE CACHE OFFLINE SHARING OF PROJECT FILES

BACKGROUND

With the advent of the computer age, business enterprises and other organizations utilize project management software for scheduling tasks and allocating resources over the course of a project (i.e., a set of activities of finite duration). For example, modern project management application programs assist project managers in developing plans, assigning resources (e.g., people, equipment, and materials) to tasks, tracking progress, managing budgets and analyzing workloads. Each resource can be assigned to multiple tasks in multiple plans and each task can be assigned multiple resources. Tasks are scheduled based on the resource availability as defined in resource calendars. In short, project management application programs greatly facilitate the management of projects in an organization.

In order for multiple users to access the contents of a single project, modern project management application programs also include a collaboration component for accessing a shared project over a computer network so that multiple users may modify different sections of a project simultaneously. For example, a user may access a shared project to update areas the user is personally responsible for. The collaboration component is implemented on a server in a client-server computer network. In the network, a server stores project data in a central database. Users may view, retrieve, and modify server project data from a conventional desktop or laptop computer (i.e., a client computer) by connecting to the server over the network.

Problems occur, however, when project files retrieved from the server are modified offline by users without a connection or access to the server. For example, a project manager may e-mail a project file to an employee in a remote office to add tasks to a project on which both are working. The remotely located employee does not have access to the server's central database. The remotely located employee modifies the project file (e.g., adds projects tasks) and then e-mails the modified file back to the project manager. In current project management application programs, project files modified offline may not be integrated into an existing project but may only be saved as new project files. As a result, a single project file may be associated with numerous additional project files representing minor modifications to an existing project.

It is with respect to these considerations and others that the various embodiments of the present invention have been made.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention solve the above and other problems by utilizing, in a client-server computer system, an active cache to share server-based project files so that they may be modified offline and updated using a project management application program. The active cache is a client-based logical storage component which is capable of storing project files from the server as well as storing project files which have been modified offline. The active cache is in communication with the server and thus is capable of communicating data between client and server project management application programs.

According to one embodiment of the invention, a project file copied from the server in the active cache is saved as an offline share file for sharing with an offline client computer (i.e., a computer not in communication with the server). The offline share file is then sent to the offline client computer for editing or modification by a user. After the offline file has been modified, the modified file is received from the offline client and saved back to the active cache. The active cache then communicates the modified file to the server which is used to update the sever-based project file. Thus, by utilizing the active cache, a user does not have to have server access to modify server-based project files.

These and various other features, as well as advantages, will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to the utilization, in a client-server computer system, an active cache to share server-based project files so that they may be modified offline and updated using a project management application program. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Referring now to the drawings, in which like numerals represent like elements through the several figures, various aspects of the present invention and an illustrative computing operating environment will be described. In particular, FIG. 1 and the corresponding discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer-readable media. The computer program product may be a computer storage media readable by a computer system and encoding a computer program of instructions for executing a computer process. The computer program may also be a propagated signal on a carrier readable by a computing system and encoding a computer program of instructions for executing a computer process.

Figure 1:
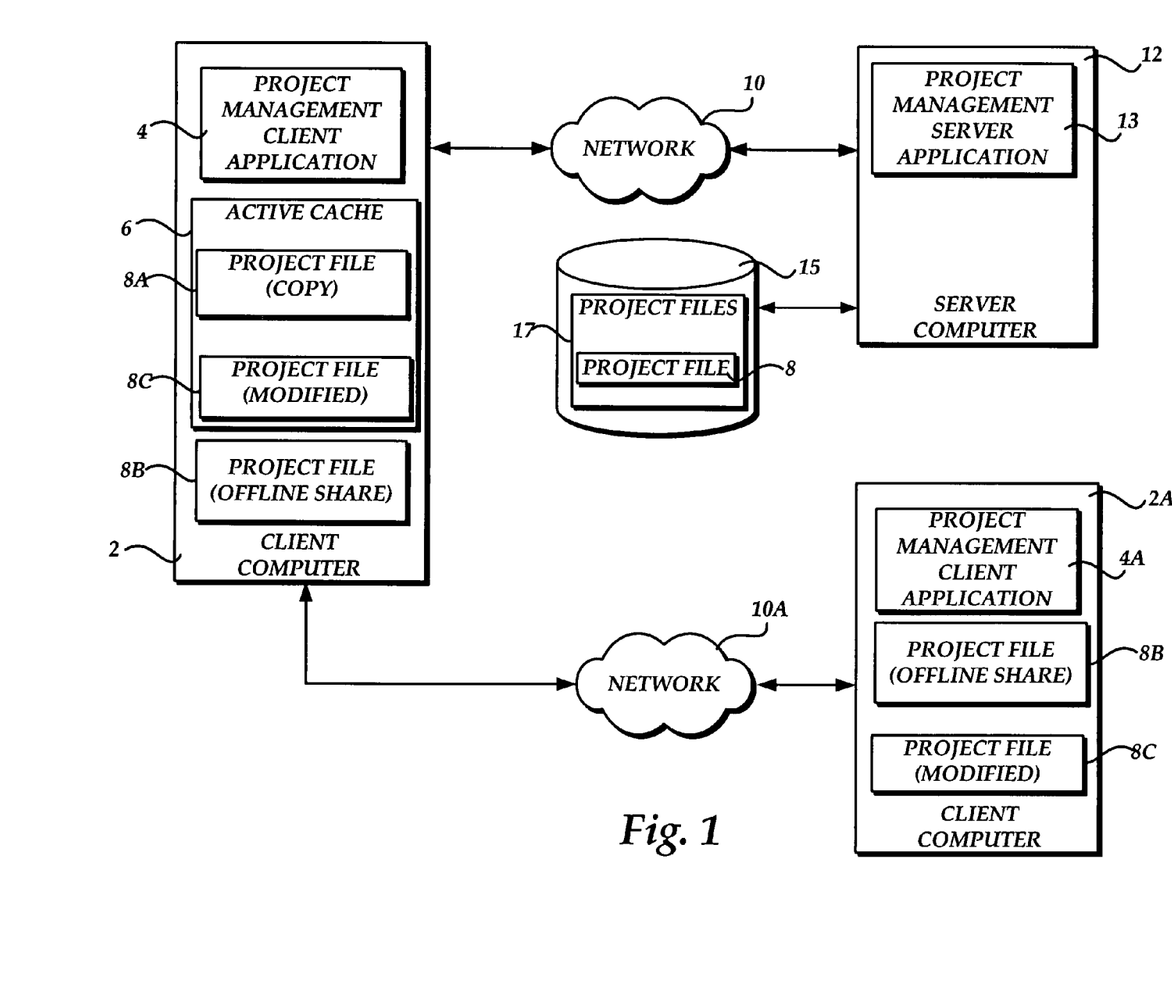
FIG. 1 is a computer network diagram illustrating aspects of multiple computer systems utilized in and provided by the various embodiments of the invention.

Referring now to FIG. 1, an illustrative operating environment for the several embodiments of the invention will be described. As shown in FIG. 1, a network 10 interconnects a client computer 2 and a server computer 12. It should be appreciated that the network 10 may comprise any type of computing network, including a local area network or a wide area network, such as the Internet. The network 10 provides a medium for enabling communication between the client computer 2, the server computer 12, and potentially other computer systems connected to or accessible through the network 10. The illustrative operating environment also includes a network 10A which interconnects client computers 2 and 2A. It should be appreciated that the network 10A may comprise a computing network similar to that of the network 10, discussed above.

The client computer 2 comprises a general purpose desktop or laptop computer capable of executing one or more application programs. In particular, according to the various embodiments of the invention, the client computer 2 is operative to execute a project management client application 4. The project management client application 4 provides functionality for creating projects. Projects may include data for developing plans, assigning resources (e.g., people, equipment, and materials) to tasks, tracking progress, managing budgets and analyzing workloads.

According to embodiments of the invention, the project management client application 4 may be utilized to create or modify project files 8A, 8B, and 8C. The project files 8A-8C are files that may contain one or more tasks relating to project plans, resources, and budgets for a project created in the project management application 4. The client computer 2 also includes an active cache 6. As defined herein, an active cache is a logical storage component which is capable of storing project files. The active cache 6 is in communication with the server 12 and thus is capable of communicating project data between client and server project management applications 4 and 13. The active cache 6 stores the project files 8A and 8C.

According to the embodiments of the invention, the active cache 6 may be utilized by the project management client application 4 to store copies of project files (e.g., the project file 8A) from the server 12, store project files (e.g., the project file 8C) modified offline (i.e., the project file is modified without having access to the server), and to retrieve a project file (e.g., the project file 8B) to share with one or more offline users. It should be appreciated that, according to one embodiment of the invention, the project management client application 4 comprises the PROJECT project management application program from MICROSOFT® CORPORATION of Redmond, Wash. It should be appreciated, however, that the various aspects of the invention described herein may be utilized with other project management application programs from other manufacturers. Additional details regarding the functionality of the project management client application 4 and the active cache 6 will be provided below with respect to FIGS. 2-6.

The server computer 12 may be operative to execute a project management server application 13. The project management server application 13 provides functionality for multiple users to collaborate on projects stored in a central database. In particular, the project management server application 13 enables multiple users to access project files 17 stored in database 15, including the project file 8. According to various embodiments of the invention, the project management client application 4 may retrieve project files from the server database 15 using a "checkout" procedure. As will be described in greater detail below, project files may be checked out from the server 12 to the client computer 2 by requesting them from the database 15. It should be understood that when a project file is checked out, the original project file remains on the server and a copy of the project file is saved to the client computer. Once a project file is retrieved from the database 15, a flag is set in the database 15 indicating the file as checked out. Once a project file is checked out from the server 12 (through the database 15) to a user, other users are prevented from retrieving or modifying data in the checked out file (i.e., the server-based project file). It should be appreciated that, according to one embodiment of the invention, the project management client application 4 comprises the PROJECT SERVER project management application program from MICROSOFT® CORPORATION of Redmond, Wash. It should be appreciated, however, that the various aspects of the invention described herein may be utilized with other project management application programs from other manufacturers.

The client computer 2A may be operative to execute a project management client application 4A. It should be appreciated that the project management client application 4A has similar functionality to project management client application 4 with respect to creating and/or modifying project files. In particular, according to various embodiments of the invention, the project management client application 4 is utilized to receive the project file 8B from the client computer 2A and modify it, and save the file as the modified project file 8C.

Figure 2:
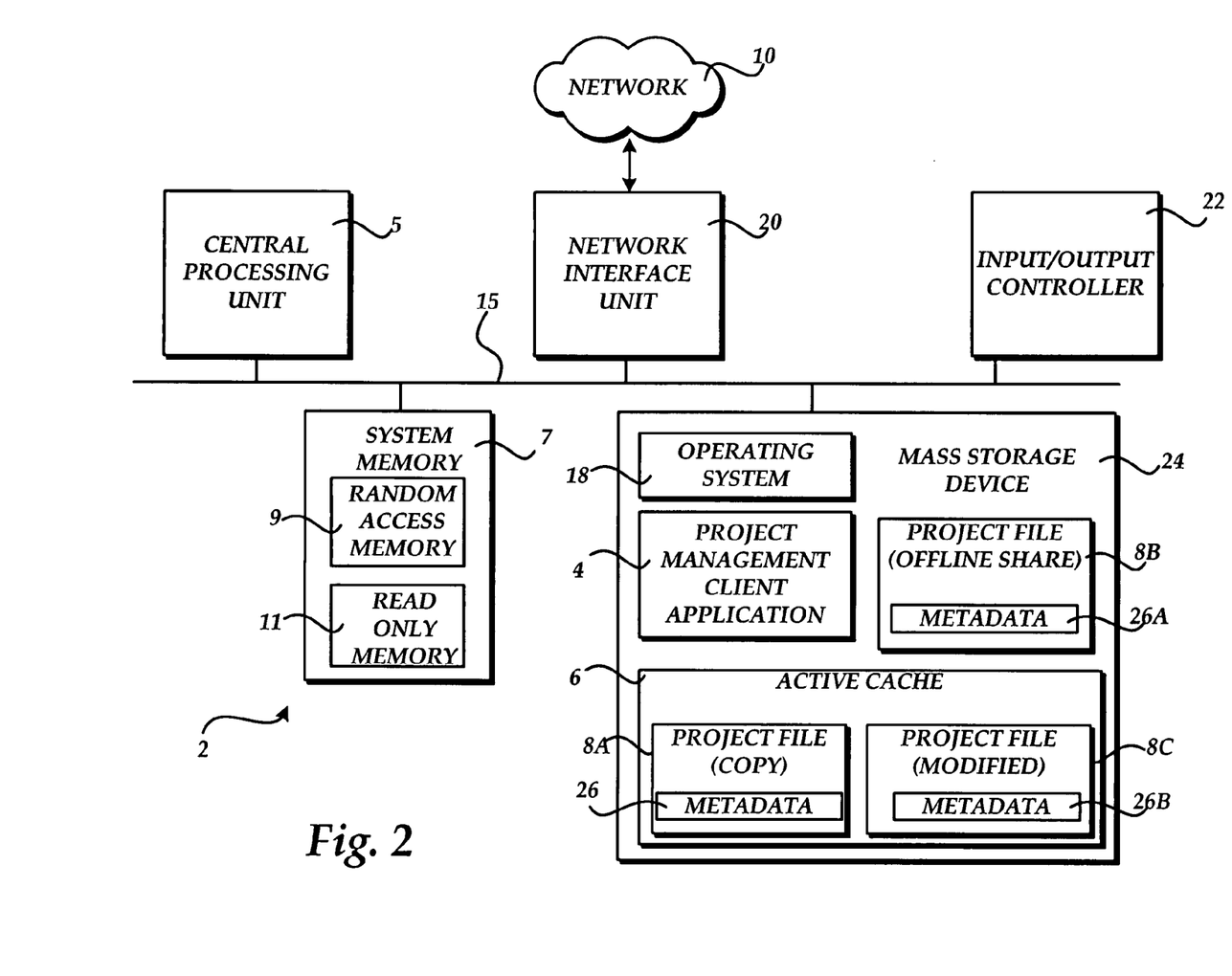
FIG. 2 is a computer system architecture diagram illustrating aspects of a client computer system utilized in and provided by the various embodiments of the invention.

Referring now to FIG. 2, an illustrative computer architecture for the client computer 2 utilized in the various embodiments of the invention will be described. The computer architecture shown in FIG. 2 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11.

The client computer 2 further includes a mass storage device 24 for storing an operating system 18, application programs, and other program modules, which will be described in greater detail below.

The mass storage device 24 is connected to the CPU 5 through a mass storage controller (not shown) connected to the bus 12. The mass storage device 24 and its associated computer-readable media provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory, CD-ROM, digital versatile disks ("DVD"), or other optical storage, magnetic cassettes, magnetic tape, magnetic disk storage or other magnetic storage devices, or any other storage medium which can be used to store the desired information and which can be accessed by the client computer 2.

According to various embodiments of the invention, the client computer 2 may operate in a networked environment using logical connections to remote computers through a network 10, such as the Internet. The client computer 2 may connect to the network 10 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 24 and RAM 9 of the computer 2, including an operating system 18 suitable for controlling the operation of a networked personal computer, such as the WINDOWS® XP operating system from MICROSOFT® CORPORATION of Redmond, Wash. The mass storage device 24 and RAM 9 may also store one or more program modules. In particular, the mass storage device 24 and the RAM 9 may store the project management client application 4, as described above.

The mass storage device 24 and RAM 9 may also store the active cache 6 for storing the project files 8A and 8B as well as the project file 8C (created by the project management client application 4A on the client computer 2A). According to the various embodiments of the invention, the project management client application 4 (as well as project management server application 13 and the project management client application 4A) is also operative to generate metadata 26 for identifying various settings associated with a project file. Accordingly, each of the project files 8A-8C includes metadata 26A-26C, respectively. As will be discussed in greater detail below, the metadata 26A-26C may utilize a field to indicate a unique identification for each created project file. In one embodiment of the invention, the unique identification may comprise a Globally Unique Identifier ("GUID") which is a unique 128-bit number that may be generated by the project management applications 4 and 4A to uniquely identify project files. The metadata 26A-26C may also utilize fields to indicate a date and/or time when a project file was last modified, opened, or checked out and may set a data type for this information as a timestamp. The metadata 26A-26C may also utilize fields to indicate whether a project file has been checked out from the server (i.e., "IsCheckedOut"—data type "Boolean"), who has checked out a project file (i.e., "Checkout by"—data type "String"), and "Project indicating whether a checked out project file has been shared for editing by one or more users (i.e., "Project Shared to others"—data type "Boolean"). According to the embodiments of the invention, the project management client application may utilize the active cache 6 to save project files in the active cache 6 for sharing with offline users (i.e., "offline share"). It should be understood that offline share project files are marked as read-only files when viewing them in the active cache 6.

It should be appreciated that, in embodiments of the invention, the project management client application program 4 is also operative to generate a user interface for allowing a user to open and save project files for offline sharing. An illustrative user interface generated by the project management application 4 for opening and saving project files will be described in greater detail below with respect to FIGS. 5 and 6.

Figure 3:
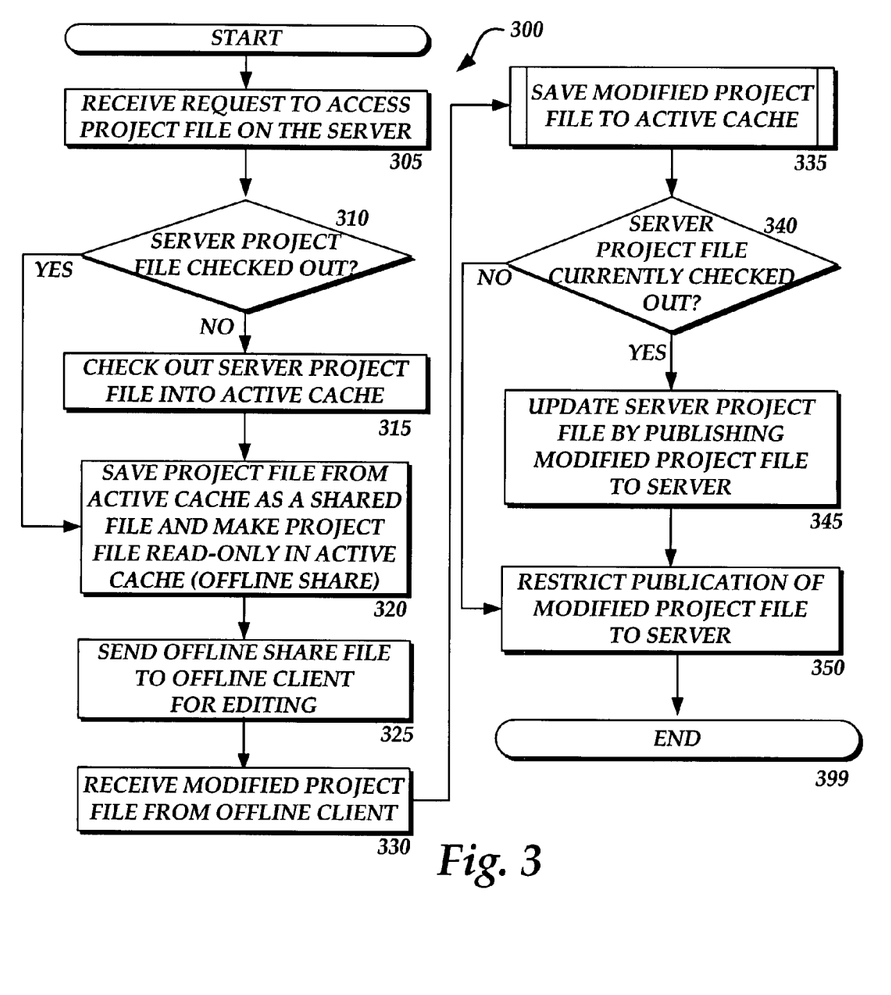
FIG. 3 is a flow diagram illustrating aspects of a process for utilizing an active cache to share server-based project files with an offline client for editing in a project management application program.

Referring now to FIG. 3, an illustrative routine 300 will be described illustrating a process performed by the project management client application 4 for utilizing an active cache to share server-based project files with an offline client for editing. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3 and 4, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 305, where a user utilizes the project management client application 4 to request a project file from the server 12 to share with offline users. In particular, the user requests the server to retrieve a project file from the project files 17 stored in the database 15. For example, a project manager in a corporate office may request the project file 8 to send to an associate overseas for editing and who is also working on the same project but does not have access to the server 12.

From operation 305, the routine 300 continues to operation 310, where the project management client application 4 determines if the requested server project file 8 is currently checked out of the database 17 to the active cache 6. In particular, the project management client application 4 may send a request to the server 12 to check metadata associated with the server project file 8 to determine whether the "IsCheckedOut" field in the metadata has been checked or marked in the database 15. It should be understood that all checked out files from the sever 12 are saved to the active cache 6. For example, the checked out version of the server-based project file 8 is the project file 8A (copy) stored in the active cache 6.

If, at operation 310, the project management client application 4 determines that the server project file 8 is checked out to the requesting user, then the routine 300 branches to operation 320. At operation 320, the project management client application 4 utilizes the active cache 6 to save the checked out version of the server-based project file 8 (i.e., the project file 8A) from the active cache 6 as the offline share project file 8B. As briefly discussed above, a user may initiate a save a project file from the active cache 6 for sharing with other users. It should be understood that once a project file is saved for sharing (i.e., an offline share file), the user will only have read-only access to the file in the active cache 6. Furthermore, the active cache 6 is operative to check or mark the "Project Shared to others" field in the metadata 26A of the project file 8A, indicating that the project file 8A is read-only. An illustrative user interface for permitting a user to save a project file as an offline share file will be described in greater detail below with respect to FIG. 6.

If, at operation 310, the project management client application 4 determines that the server project file 8 is not checked out to the requesting user, then the routine 300 continues to operation 315 where the project management client application 4 checks out the server project file 8 into the active cache 6 as the project file 8A. In particular, the project management client application 4 may send a request to the server 12 to retrieve the server project file 8 from the database 15 and send a copy to the active cache 6 on the client computer 2. Once a project file has been checked out from the server, the project management server application 13 marks or designates the project file as checked out in the database 15. From operation 315, the routine continues to operation 320 (discussed above).

From operation 320, the routine 300 continues to operation 325 where a user of the project management client application 4 sends the project file 8B to an offline client for editing. In particular, a user may send the project file 8B from the client computer 2 in an electronic mail message to a user of the client computer 2A for editing. As discussed above, the client computer 2A is operative to execute the project management client application 4A which may be utilized to edit the project file 8B. For example, a user of the project management client application 4A may edit the project file 8B by adding new project data, such as new tasks and resources, to an existing project in the file. Once the project file 8B has been modified by the user of the project management client application 4A, the user may save the file as the modified project file 8C. It should be appreciated that the communication of the project file 8B between the client computer 2 and the client computer 2A is not limited to electronic mail and that other methods of data communication known to those skilled in the art may also be utilized.

From operation 325, the routine 300 continues to operation 330 where a user of the client computer 2 receives the modified project file 8C from the user of the client computer 2A. As discussed above, the project file 8C may be received in an electronic mail message or using some other means of communication.

From operation 330, the routine 300 continues to operation 335 where the user of the project management client application 4 saves the project file 8C to the active cache 6. In saving the project file 8C, the active cache may execute a number of checks to determine the identity of the file and whether the project file 8C may be saved as a modified version of the project file 8B. Additional details regarding the functionality of the active cache 6 in saving modified project files will be provided below with respect to FIG. 4.

From operation 335, the routine 300 continues to operation 340 where the project management client application 4 utilizes the active cache 6 to determine if the server project file 8 is currently checked out. In particular, the project management client application 4 may request the server 12 to check with the database 15 to determine if metadata for the server project file 8 indicates that the file is still checked out to the requesting user (i.e., by checking the "IsCheckedOut" and "Checkout by" fields).

If, at operation 340, the project management client application 4 determines that the server project file 8 is currently checked out, then the routine 300 continues to operation 345 where the project management client application 4 utilizes the active cache 6 to publish the modified project file 8C to the server 12. In particular, the active cache 6 executes a background thread to merge or synchronize the project data which was added in the project file 8C with existing project data in the project file 8 stored in the database 15. From operation 340, the routine 300 branches to operation 399, where it ends.

If, at operation 340, the project management client application 4 determines that the server project file 8 is not currently checked out, then the routine 300 continues to operation 350 where the project management client application 4 restricts the save of the modified project file 8C to the server 12. In particular, if the server project file 8 is checked in to the server 12, it should be understood that the user no longer has permission to work on the file. As a result, the project management client application 4 will not publish the modified project file 8C for merging on the server 12 but, alternatively, may prompt the user to save the modified project file 8C as a new project file on the server. From operation 350, the routine 300 branches to operation 399, where it ends.

Figure 4:
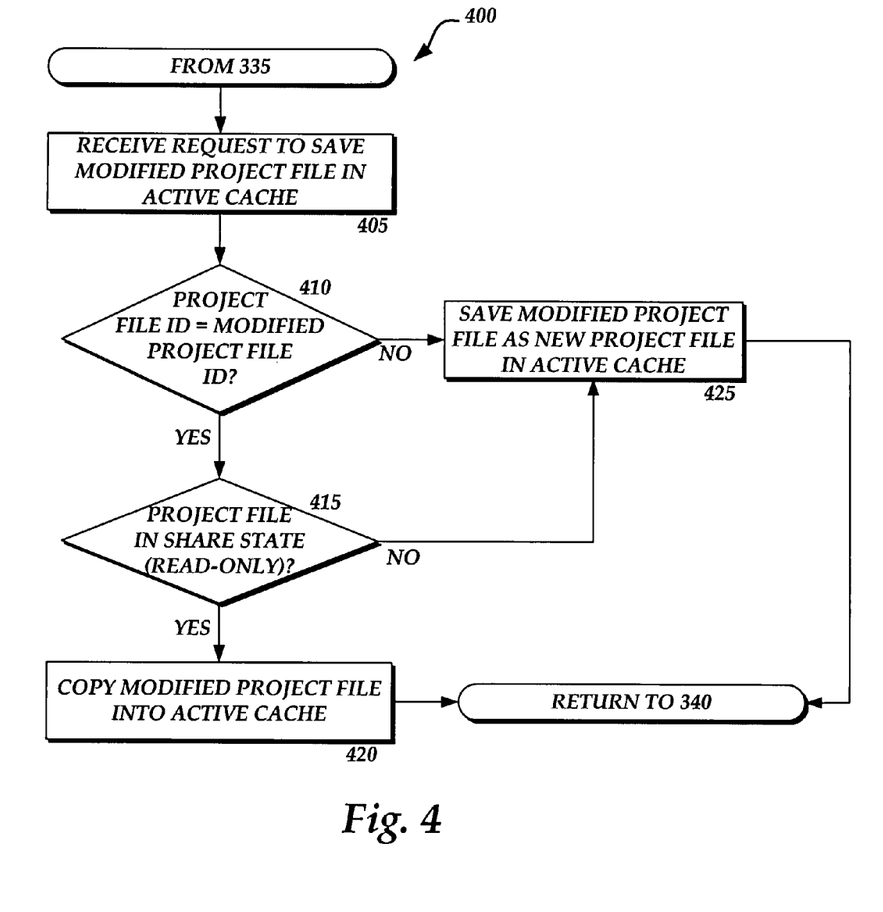
FIG. 4 is a flow diagram illustrating aspects of a process for saving a modified project file to an active cache according.

Referring now to FIG. 4, an illustrative routine 400 will be described illustrating a process performed by the project management client application 4 for utilizing the active cache 6 to save the modified project file 8C to the active cache 6. The routine 400 begins from operation 335 of FIG. 3 at operation 405, where the active cache 6 receives a user request to save the modified project file 8C.

From operation 405, the routine 400 continues to operation 410, where the project management client application 4 utilizes the active cache 6 to determine if a project file identification for the project file 8C matches a project file identification for the project file 8A (i.e., the previous version of the project file). In particular, the active cache 6 is utilized to parse the metadata 26A and 26C associated with the project files 8A and 8C, respectively, for an ID (such as a GUID) which is generated and assigned to the project files by the project management client applications 4 and 4A. It will be appreciated that the ID may be utilized to identify modified project files which may have been saved with different names from their pre-modified versions. For example, the project file 8A may have been sent to the user of the client computer 2A bearing the name "Project 1" while the modified project file 8C may have been saved bearing the name "Project 1 (revised)." However, both the project files 8A and 8C will have the same ID.

If, at operation 410, the identifications between the project files 8A an 8C are identical, then the routine 400 continues to operation 415, where the project management client application 4 utilizes the active cache 6 to determine if the project file 8A is still in a share state (i.e., saved out for sharing). In particular, the active cache 6 is utilized to parse the metadata 26A associated with the project file 8A to check the "Project Shared to others" field to determine if the project file 8A is still designated as an offline share file. As discussed above, a project file may be designated as an offline share file to allow offline users to modify the project file. When a project file is designated as an offline share file, the project file in the active cache 6 may be copied to create a version of the file for an offline user (e.g., the project file 8B) and the project file in the active cache 6 is designated as read-only.

If, at operation 410, the identifications between the project files 8A and 8C are not identical, then the routine 400 branches to operation 425 where the modified project file 8C is saved as a new project file in the active cache 6. If, at operation 415, the project file 8A is determined to still be in a share state, then the routine 400 continues to operation 420 where the modified project file 8B is copied into the active cache 6 by the project management application 4. From operation 415, the routine 400 then returns to operation 340 of FIG. 3. If, at operation 415, the project file 8A is not determined to still be in a share state, then the routine 400 branches to operation 425 (discussed above).

Figure 5:
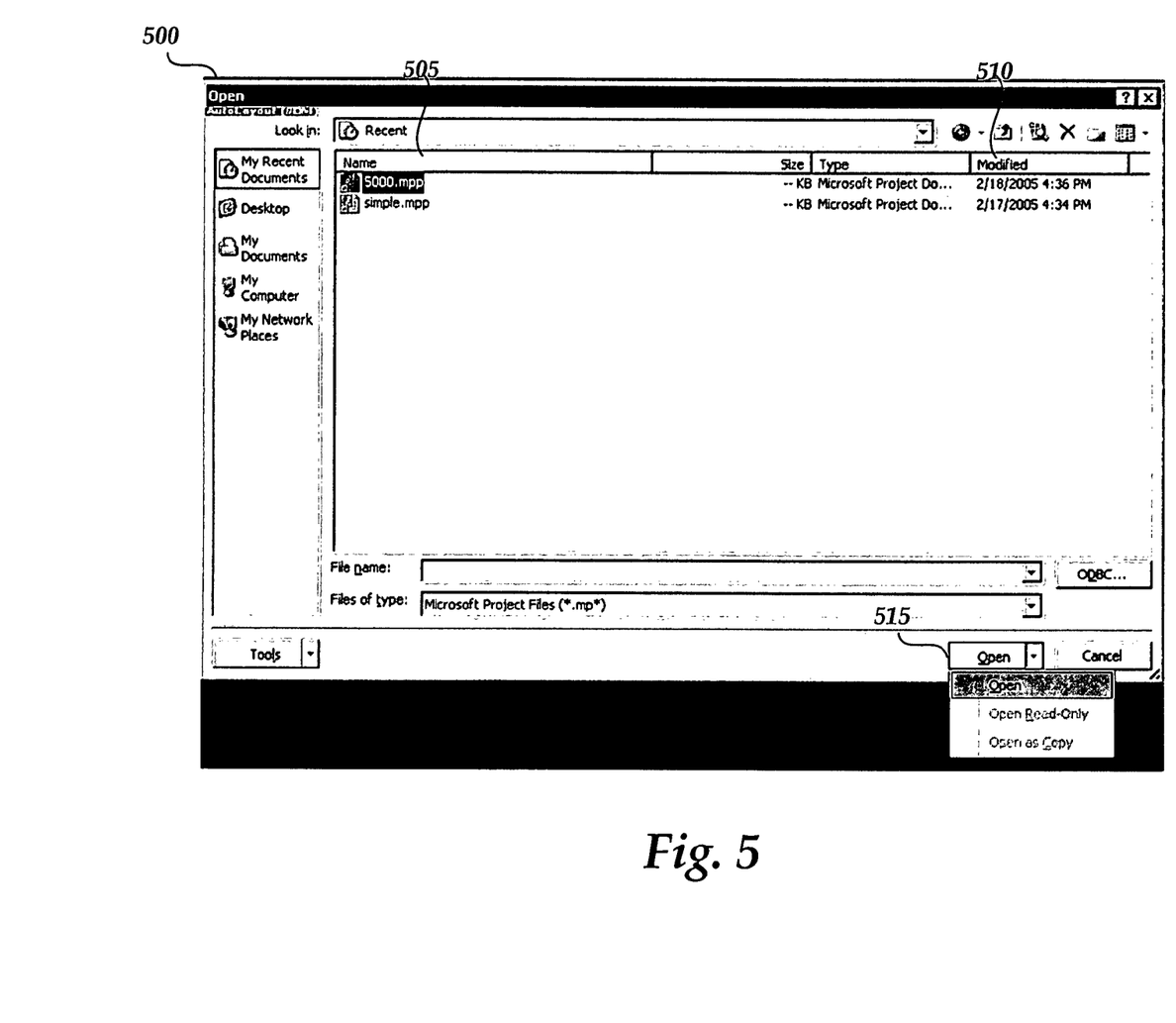
FIG. 5 is a computer screen display illustrating a user interface through which a user can select project files to open from an active cache.

Referring now to FIG. 5, an illustrative user interface will be described for allowing a user to select project files to open from the active cache 6. FIG. 5 shows a user interface 500 which includes a Name column listing project files and a Modified column indicating a date and time when the project file was last modified. The user interface 500 also includes a dropdown menu 515 from which a user may select an option to open a project file.

Figure 6:
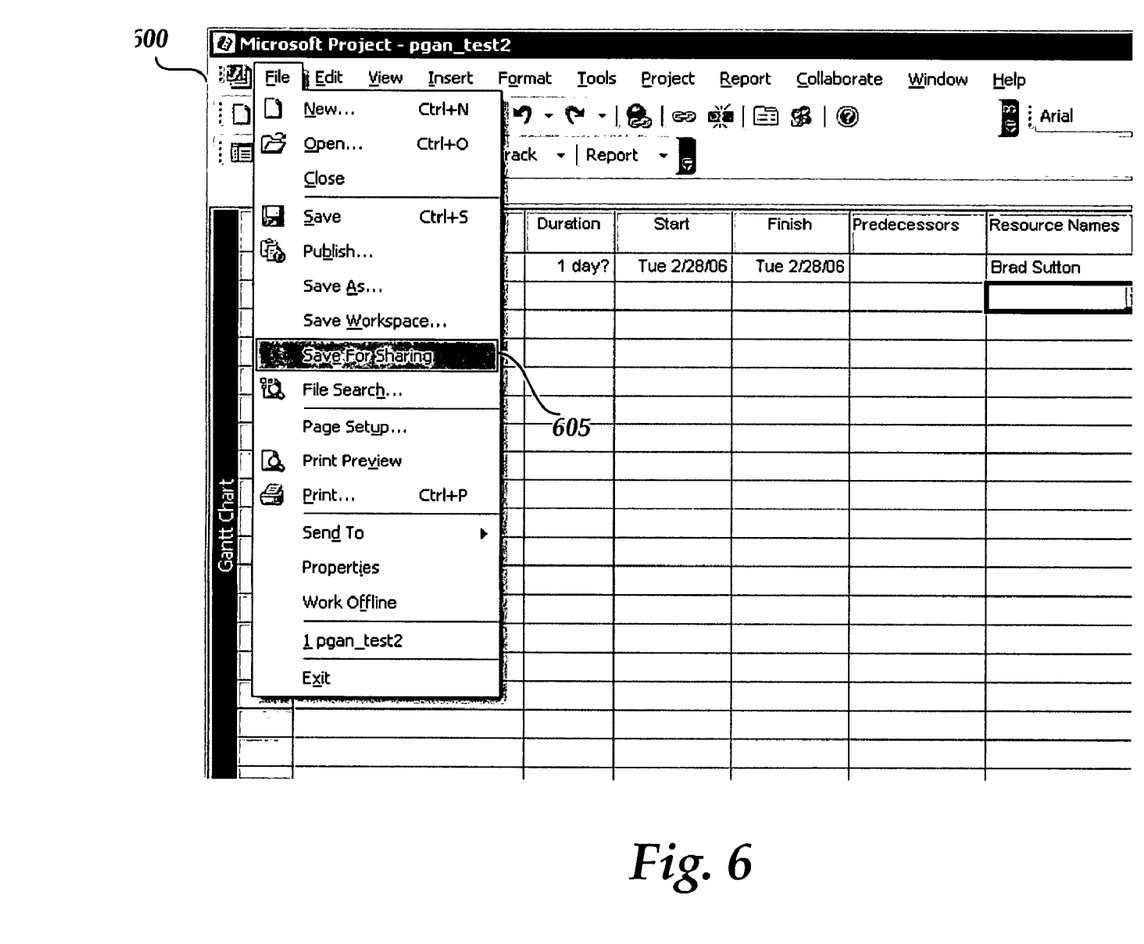
FIG. 6 is a computer screen display illustrating a user interface through which a user can save project files for offline sharing.

Referring now to FIG. 6, an illustrative user interface will be described for allowing a user to save a project file as an offline share file for sharing with offline users. FIG. 6 shows a user interface 600 which includes a dropdown menu 605 from which a user may select to an option to save a project file for sharing with offline users.

It should be appreciated that according to an alternative embodiment of the present invention, the client-server computer system may not include a remote user such as the client computer 2A for editing the offline share project file 8B. That is, the client computer 2 may be utilized to edit the project file 8B once it is copied from the active cache 6. It should be understood that the project file 8B, once copied from the active cache 6 is "offline" in that the project file is not in communication with the server 12, unlike the active cache 6. Thus, the offline project file may be modified by a user as discussed above in the description of FIGS. 3-4, above.

Based on the foregoing, it should be appreciated that various embodiments of the invention provide for utilizing, in a client-server computer system, an active cache to share server-based project files so that they may be modified offline and updated using a project management application program. It will be apparent by those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A computer-implemented method for utilizing, in a client-server computer system, an active cache to share server-based project files with a client that does not have access to a project management server for editing in a project management application program, comprising:

receiving, on a client having access to a project management server, a copy of a project file of the project management server;

storing, in an active cache of the client having access to the project management server, the copy of the project file of the project management server, wherein the active cache is in communication with the project management server;

saving the copy of the project file of the active cache as an offline share file for sharing with the client that does not have access to the project management server;

causing read-only access, on a client having access to a project management server, for the project file in the active cache upon saving the project file as an offline share file;

sending via electronic mail, from the client having access to the project server, the offline share file to the client that does not have access to the project management server;

receiving via electronic mail, on the client having access to the project server, a modified file from the client that does not have access to the project management server;

determining whether a metadata identifier of the received modified file matches a metadata identifier of the copy of the project file on the active cache of the client having access to the project management server;

when the metadata identifier of the received modified file matches a metadata identifier of the copy of the project file on the active cache of the client having access to the project management server:

saving the modified file to the active cache as a modified project file, wherein saving the modified file to the active cache as a modified project file, comprises:

determining whether the project file in the active cache is currently in a share state, wherein the share state identifies the project file as having the read-only access, when the project file is in the share state, then copying the modified project file into the active cache, when it is determined that the copy of the project file in the active cache is not currently in a share state then saving the modified file as a new project file in the active cache; and updating the project file on the server with the modified project file, wherein updating the project file on the server with the modified project file comprises:

causing the active cache to communicate with the project management server to determine a current checkout status for the project file of the project management server, when the project file of the project management server is currently checked out, then causing the active cache to publish the modified project file to the server, when the project file of the project management server is not currently checked out, then restricting the save of the modified project file to the project management server.

2. The method of claim 1, wherein sending the offline share file to the client that does not have access to the project management server comprises sending the offline share file to the client that does not have access to the project management server for adding new project data to an existing project in the offline share file.

3. The method of claim 1, wherein determining whether a metadata identifier of the received modified file matches a metadata identifier of the copy of the project file on the active cache of the client having access to the project management server-comprises parsing the metadata identifier of the received modified file and the metadata identifier of the copy of the project file for a globally unique identifier.

4. The method of claim 1, wherein determining if the copy of the project file in the active cache is in a share state comprises parsing the metadata identifier of the copy of the project file.

5. The method of claim 1, wherein when it is determined that the metadata identifications do not match then saving the modified file as a new project file in the active cache.

6. The method of claim 1, wherein publishing the modified project file to the project management server comprises executing a background thread to merge project data added in the modified project file with existing project data in the project file on the project management server.

7. A computer-readable storage medium having computer executable instructions for utilizing, in a client-server computer system, an active cache to share server-based project files with a client that does not have access to a project management server for editing in a project management application program, comprising:

receiving, on a client having access to a project management server, a copy of a project file of the project management server;

storing, in an active cache of the client having access to the project management server, the copy of the project of the project management server, wherein the active cache is in communication with the project management server;

saving the copy of the project file of the active cache as an offline share file for sharing with the client that does not have access to the project management server;

causing read-only access, on a client having access to a project management server, for the project file in the active cache upon saving the project file as an offline share file;

sending via electronic mail, from the client having access to the project server, the offline share file to the client that does not have access to the project management server;

receiving via electronic mail, on the client having access to the project server, a modified file from the client that does not have access to the project management server;

determining whether a metadata identifier of the received modified file matches a metadata identifier of the copy of the project file on the active cache of the client having access to the project management server;

when the metadata identifier of the received modified file matches a metadata identifier of the copy of the project file on the active cache of the client having access to the project management server:

saving the modified file to the active cache as a modified project file, wherein saving the modified file to the active cache as a modified project file, comprises:

determining whether the project file in the active cache is currently in a share state, wherein the share state identifies the project file as having the read-only access, when the project file is in the share state, then copying the modified project file into the active cache, when it is determined that the copy of the project file in the active cache is not currently in a share state then saving the modified file as a new project file in the active cache; and updating the project file on the server with the modified project file, wherein updating the project file on the server with the modified project file comprises:

causing the active cache to communicate with the project management server to determine a current checkout status for the project file of the project management server;

when the project file of the project management server is currently checked out, then causing the active cache to publish the modified project file to the server, when the project file of the project management server is not currently checked out, then restricting the save of the modified project file to the project management server.

8. The computer-readable storage medium of claim 7, wherein sending the offline share file to the client that does not have access to the project management server comprises sending the offline share file to the client that does not have access to the project management server for adding new project data to an existing project in the offline share file.

9. The computer-readable storage medium of claim 7, wherein determining whether a metadata identifier of the received modified file matches a metadata identifier of the copy of the project file on the active cache of the client having access to the project management server comprises parsing the metadata identifier of the received modified file and the metadata identifier of the copy of the project file for a globally unique identifier.

10. The computer-readable storage medium of claim 7, wherein determining if the copy of the project file in the active cache is in a share state comprises parsing the metadata identifier of the copy of the project file.

11. The computer-readable storage medium of claim 7, wherein when it is determined that the metadata identifications do not match then saving the modified file as a new project file in the active cache.

12. The computer-readable storage medium of claim 7, wherein publishing the modified project file to the project management server comprises executing a background thread to merge project data added in the modified project file with existing project data in the project file on the project management server.

13. A system for utilizing, in a client-server computer system, an active cache to share server-based project files with a client that does not have access to a project management server for editing in a project management application program, comprising:

a processor; and a memory having computer executable instructions thereon, wherein the computer-executable instructions are configured for:

receiving, on a client having access to a project management server, a copy of a project file of the project management server;

storing, in an active cache of the client having access to the project management server, the copy of the project of the project management server, wherein the active cache is in communication with the project management server;

saving the copy of the project file of the active cache as an offline share file for sharing with the client that does not have access to the project management server;

causing read-only access, on a client having access to a project management server, for the project file in the active cache upon saving the project file as an offline share file;

sending via electronic mail, from the client having access to the project server, the offline share file to the client that does not have access to the project management server;

receiving via electronic mail, on the client having access to the project server, a modified file from the client that does not have access to the project management server;

determining whether a metadata identifier of the received modified file matches a metadata identifier of the copy of the project file on the active cache of the client having access to the project management server;

when the metadata identifier of the received modified file matches a metadata identifier of the copy of the project file on the active cache of the client having access to the project management server:

saving the modified file to the active cache as a modified project file, wherein saving the modified file to the active cache as a modified project file, comprises:

determining whether the project file in the active cache is currently in a share state, wherein the share state identifies the project file as having the read-only access, when the project file is in the share state, then copying the modified project file into the active cache, when it is determined that the copy of the project file in the active cache is not currently in a share state then saving the modified file as a new project file in the active cache; and updating the project file on the server with the modified project file, wherein updating the project file on the server with the modified project file comprises:

causing the active cache to communicate with the project management server to determine a current checkout status for the project file of the project management server, when the project file of the project management server is currently checked out, then causing the active cache to publish the modified project file to the server, when the project file of the project management server is not currently checked out, then restricting the save of the modified project file to the project management server.

14. The system of claim 13, wherein sending the offline share file to the client that does not have access to the project management server comprises sending the offline share file to the client that does not have access to the project management server for adding new project data to an existing project in the offline share file.

15. The system of claim 13, wherein determining whether a metadata identifier of the received modified file matches a metadata identifier of the copy of the project file on the active cache of the client having access to the project management server-comprises parsing the metadata identifier of the received modified file and the metadata identifier of the copy of the project file for a globally unique identifier.

16. The system of claim 13, wherein determining if the copy of the project file in the active cache is in a share state comprises parsing the metadata identifier of the copy of the project file.

17. The system of claim 13, wherein when it is determined that the metadata identifications do not match then saving the modified file as a new project file in the active cache.

18. The system of claim 13, wherein publishing the modified project file to the project management server comprises executing a background thread to merge project data added in the modified project file with existing project data in the project file on the project management server.

* * * * *